UNITED STATES PATENT OFFICE.

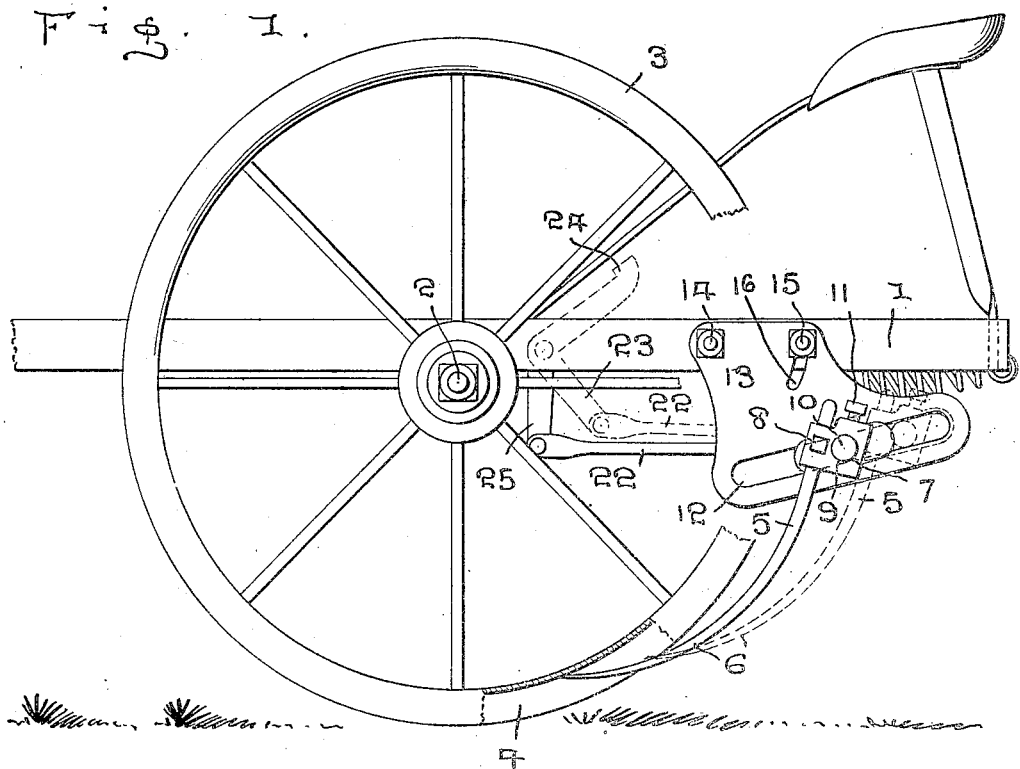

CHARLES W. STARK, OF MOUNTAIN LAKE, MINNESOTA.

WHEEL-SCRAPER.

942,471. Specification of Letters Patent. Patented Dec. 7, 1909.

Application filed May 4, 1909. Serial No. 493,821.

*To all whom it may concern:*

Be it known that I, CHARLES W. STARK, a citizen of the United States, residing at Mountain Lake, in the county of Cottonwood and State of Minnesota, have invented certain new and useful Improvements in Wheel-Scrapers; and I do hereby declare the following to be a full, clear, and exact description of the invention, such as will enable others skilled in the art to which it appertains to make and use the same.

My invention relates to new and useful improvements in wheel scrapers and more particularly to that class adapted to be used in connection with corn planters and similar devices and my object is to provide means for directing the scraper into engagement with the wheel employed for covering the grain and engage the scraper with the wheel at a point adjacent the ground.

A further object is to provide means for giving the scraper a forward and downward thrust in moving the scraper into engagement with the wheel.

A further object is to provide means for adjusting the several parts of the device.

A further object is to provide means for moving the scraper and parts containing the same forwardly and rearwardly in their bearings and a further object is to provide anti-friction devices in connection with the supporting parts of the scrapers.

Other objects and advantages will be hereinafter referred to and more particularly pointed out in the claims.

In the accompanying drawings forming part of this application, Figure 1 is a side elevation of a portion of a planter partly in section, showing the scraper in engagement with the wheel in full lines and its initial position in dotted lines. Fig. 2 is a detail sectional view showing the mechanism employed for moving the scrapers into engagement with the wheels. Fig. 3 is a detail perspective view of one end portion of the scraper supporting bar and bearings therefor, and, Fig. 4 is a detail perspective view showing the anti-friction devices for the scraper supporting bar.

Referring to the drawings in which similar reference numerals designate corresponding parts throughout the several views, 1 indicates the frame of a planter, which may be constructed in the usual or any preferred manner and 2 indicates an axle upon which are mounted the usual or any preferred form of supporting and covering wheels 3, the tread of said wheels being provided with channels or concavities 4, which will serve to move the soil inwardly and cover the grain after it is deposited in a furrow. In using this form of planter in certain classes of soil or when the soil is damp, the formation of the covering means in the tread of the wheel, will cause the soil to stick therein and unless some means is provided to immediately release the soil from the wheel, the grain will be removed from the furrow by adhering to the soil as it is elevated by the wheel and to this end, I provide my improved form of scraping device, which comprises a shank 5, having at its lower end a blade 6, the free end of which blade is formed co-incident with the general outline of the channel or covering recess in the wheel. The upper end of the shank 5 is introduced through a supporting block 7 and is adjustably held therein by means of a bolt 8, the hanger having a horizontally disposed opening 9 therein, through which extends a supporting bar 10, the block being likewise adjustably mounted on the bar by means of a binding bolt 11 and in this manner, it will be readily seen that the scraping blade may be readily raised and lowered and moved toward and from the wheel by adjusting the same on the bar 10.

The bar 10 extends laterally of the frame 1 and through elongated slots 12 in hangers 13, the upper ends of the hangers being attached to the frame 1 by means of bolts 14 and 15, the bolts 15 extending through curved slots 16 in the hangers, whereby the hangers may be swung to change the plane of the slots 12, the bolts 14 forming pivots for the hanger. The slots 12 are inclined downwardly from their rear to their forward ends, so that when the bar 10 is moved forwardly, the blades 6 will be given a downward as well as a forward thrust, this movement likewise bringing the engaging ends of the blades in juxtaposition to the soil, when said blades are moved into juxtaposition to the wheels and likewise when the bar is moved rearwardly, the blades will be elevated and moved away from the wheels and a distance above the soil. The bar 10 at its point of entrance through the slots 12 is provided with bearings 17, which are adjustably secured to the bar by means of adjusting bolts 18, said bearings having laterally extending ears 19, to which are attached anti-friction rollers 20, which rollers are so positioned as to extend through the slots 12 and travel therein, thereby practically eliminating the friction occasioned by moving the bar forwardly and rearwardly in operating the scrapers and at the same time greatly reducing the wear at this point.

Adjustably attached to the bar 10 and substantially at its longitudinal center is an arm 21, to the outer end of which is pivotally secured a link 22, the opposite end of said link being in turn pivotally secured to a bell crank lever 23, the free arm of the lever 23 having a tread 24 thereon, whereby pressure may be applied to rock the lever and move the bar 10 forwardly, the bell crank lever being pivotally mounted to parts of the planter frame. In this manner the scrapers may be brought into engagement with the wheels and held in engagement therewith any suitable length of time by applying pressure on the tread of the bell crank lever with the foot and in order to return the bar to the rear end of the slot and thus disengage the blades from the wheels, one end of a spring 25 is attached to the rear portion of the frame 1 and the opposite end thereof engaged with a curved finger 26 on the arm 21, the tension of said spring being such as to move the bar 10 rearwardly through the slots 12 and to the position shown by dotted lines in Fig. 1.

It will thus be seen that I have provided a very cheap and economical form of scraping attachment for planters and one wherein the scraper blades will be given a downward as well as a forward thrust when the blades are moved into engagement with the wheels and it will likewise be seen that the various parts of the scraping device may be readily adjusted to bring the blades into engagement with the wheels at various elevations and as the blades and lower portion of the shanks to which they are attached, are curved, said blades may be adjusted toward the wheel to compensate for wear, in which event each blade will be entirely worn out before its usefulness is destroyed.

While I have described the wheel as having channels or recesses therein to provide covering for the grain in the rows, it will be clearly understood that the blades will successfully operate with any make of wheel such as is employed for moving the soil inwardly to fill the furrows in which the grain is deposited.

What I claim is:

1. In a scraping device the combination with a frame and supporting wheels therefor, said wheels having circumferential channels; of blades adapted to be moved into engagement with said channels, a bar extending transversely of the frame, adjustable hangers on the frame having elongated slots therein to receive said bar, said slots being inclined and means to move the bar longitudinally of the slots, whereby said blades will be brought into engagement with the wheels.

2. In a scraping device the combination with a frame having carrying wheels therefor; of scraping blades adapted to engage said wheels a supporting bar, means to adjustably attach the blades to the bar, hangers adjustably secured to the frame, said hangers having elongated inclined slots through which the bar extends, bearings for said bar, anti-friction devices on the bearings adapted to enter said slots, means to adjust the bearings on the bar and means to move said bar from end to end of the slots, whereby the blades will be moved into or out of engagement with the wheels.

3. In a scraping device, the combination with a frame and carrying wheels therefor; of blades, a supporting bar for the blades, means to adjustably mount the blades on the bar, hangers on said frame, said hangers having elongated inclined slots therein, means to adjust the hangers, bearings for said bar, anti-friction devices carried by the bearings and entering said slots, a bell crank lever pivoted to the frame, means between said lever and bar adapted to move the bar forwardly in the slots when the lever is depressed and means to move the bar rearwardly in the slots when the lever is released.

In testimony whereof I have signed my name to this specification in the presence of two subscribing witnesses.

CHARLES W. STARK.

Witnesses:
  ABR. JANZEN,
  DAVID THIESSEN.